(12) United States Patent
Whiteman et al.

(10) Patent No.: US 11,008,936 B2
(45) Date of Patent: May 18, 2021

(54) ROTATIONAL DRIVE UNIT FOR A FAN

(71) Applicant: Deere & Company, Moline, IL (US)

(72) Inventors: Steven R. Whiteman, Asbury, IA (US);
Alfred S. Smemo, Dubuque, IA (US);
Reginald M. Bindl, Dubuque, IA (US);
Donald A. Fuller, Dubuque, IA (US);
Andrew J. Kindle, Asbury, IA (US)

(73) Assignee: DEERE & COMPANY, Moline, IL (US)

( * ) Notice: Subject to any disclaimer, the term of this patent is extended or adjusted under 35 U.S.C. 154(b) by 804 days.

(21) Appl. No.: 15/796,465

(22) Filed: Oct. 27, 2017

(65) Prior Publication Data
US 2019/0128180 A1 May 2, 2019

(51) Int. Cl.
| F02B 67/06 | (2006.01) |
| F16D 21/06 | (2006.01) |
| F16H 37/02 | (2006.01) |
| F16D 25/10 | (2006.01) |
| F01P 5/04 | (2006.01) |

(52) U.S. Cl.
CPC .............. *F02B 67/06* (2013.01); *F01P 5/04* (2013.01); *F16D 21/06* (2013.01); *F16D 25/10* (2013.01); *F16H 37/027* (2013.01); *F16D 2021/0661* (2013.01)

(58) Field of Classification Search
CPC .......... F02B 67/06; F16D 21/06; F16D 25/10; F16D 2021/0661; F16H 37/027
USPC ....................................................... 74/330
See application file for complete search history.

(56) References Cited

U.S. PATENT DOCUMENTS

| 2,742,798 A * | 4/1956 | Niederhauser ......... B63H 23/30 74/661 |
| 4,887,983 A * | 12/1989 | Bankstahl ............... B63H 5/10 440/57 |
| 5,667,045 A | 9/1997 | Cummings, III |
| 8,662,945 B2 * | 3/2014 | Blomdahl .............. B63H 20/20 440/75 |

(Continued)

FOREIGN PATENT DOCUMENTS

KR 101292023 B1 7/2013

OTHER PUBLICATIONS

GKN, "Rockford Fan Clutches," <http://products.gknlandsystems.info/index.php?id=41> product publically available circa 2001.

(Continued)

*Primary Examiner* — Ha Dinh Ho (57) ABSTRACT

A rotational drive unit having an input rotatable about a first axis of rotation and configured to be driven by a power source in a single rotational direction. The rotational drive unit including a first shaft in operable communication with the input and configured to rotate in a first direction, a second shaft in operable communication with the input and configured to rotate in a second direction opposite the first direction, an output rotatable about a second axis of rotation, and a clutch assembly in operable communication with the first shaft, the second shaft, and the output. Where the clutch assembly is operable in a first configuration in which force is transmitted between the first shaft and the output, and a second configuration in which force is transmitted between the second shaft and the output.

16 Claims, 3 Drawing Sheets

(56) References Cited

U.S. PATENT DOCUMENTS

| | | | |
|---|---|---|---|
| 8,807,313 B2 | 8/2014 | Roby | |
| 8,851,028 B2 | 10/2014 | Pickelman, Jr. et al. | |
| 9,599,009 B2 | 3/2017 | Smemo et al. | |
| 9,856,005 B2* | 1/2018 | Flodman | B63H 20/20 |
| 2015/0353177 A1* | 12/2015 | Flodman | B63H 20/20 440/75 |
| 2017/0152789 A1 | 6/2017 | Benevelli et al. | |

OTHER PUBLICATIONS

German Search Report issued in counterpart application No. 102018216243.3 dated Apr. 30, 2020 (06 pages).

\* cited by examiner

ROTATIONAL DRIVE UNIT FOR A FAN

BACKGROUND

The present disclosure relates to a rotational drive unit for a cooling fan.

During operation of an internal combustion engine or other heat generating devices a cooling system is typically used to help regulate the operating temperature of the device. In such instances, a forced air system or fan is used to help direct air through the cooling system (e.g., the heat exchanger and any protective screens) and improve the efficiency of the cooling process. When doing so, debris typically becomes lodged in the cooling system as air passes therethrough during normal operating conditions. This debris must be cleaned from time to time to assure the necessary airflow continues to occur to maintain proper cooling capacity.

SUMMARY

In one aspect, the disclosure provides a rotational drive unit including an input rotatable about a first axis of rotation, the input configured to be driven by a power source in a single rotational direction, a first shaft in operable communication with the input and configured to rotate in a first direction, a second shaft in operable communication with the input and configured to rotate in a second direction opposite the first direction, an output rotatable about a second axis of rotation, and a clutch assembly in operable communication with the first shaft, the second shaft, and the output, where the clutch assembly is operable in a first configuration in which force is transmitted between the first shaft and the output, and a second configuration in which force is transmitted between the second shaft and the output.

In another aspect, the disclosure provides a rotational drive unit for a fan including a housing, an input rotatable with respect to the housing about a first axis of rotation, where the input is rotatable in only a first direction, a first shaft driven by the input and configured to rotate with respect to the housing in the first direction, a second shaft driven by the input and configured to rotate with respect to the housing in only a second direction opposite the first direction, an output rotatable with respect to the housing about a second axis of rotation, a first clutch assembly in operable communication with the first shaft and the output, where the first clutch assembly is operable in an engaged configuration in which force is conveyed between the first shaft and the output, and a disengaged configuration in which force is not conveyed between the first shaft and the output, and a second clutch assembly in operable communication with the second shaft and the output, where the second clutch assembly is operable in an engaged configuration, in which force is conveyed between the second shaft and the output, and a disengaged configuration, in which force is not conveyed between the second shaft and the output.

In another aspect, the disclosure provides a fan drive unit operable with a belt drive of an internal combustion engine, the fan drive unit including a housing, an input configured to engage the belt drive of the internal combustion engine and rotatable with respect to the housing in a single direction, a first shaft driven by the input and configured to rotate with respect to the housing in the first direction, a second shaft driven by the first shaft and configured to rotate with respect to the housing in only a second direction, opposite the first direction, an output configured to rotate with respect to the housing about a first axis of rotation, and a clutch assembly in operable communication with the first shaft, the second shaft, and the output, where the fan drive unit is operable in a forward configuration in which the output rotates about the first axis in the first direction, and a second configuration in which the output rotates about the first axis in the second direction.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of the formation and arrangement of components set forth in the following description or illustrated in the accompanying drawings. The disclosure is capable of supporting other implementations and of being practiced or of being carried out in various ways.

The disclosure relates to a rotational drive unit and more particularly to a rotational drive unit for use with a cooling fan of a cooling system for an internal combustion engine. In particular, the drive unit is configured to support and selectively rotate a cooling fan in both a forward and a rearward direction while receiving input in only a single rotational direction. By changing the direction of fan rotation, the drive unit and cooling fan are able to direct air through the cooling system (e.g., the heat exchanger and any protective screens) in two different directions thereby allowing the system to clear any debris that may have become lodged therein during use. Furthermore, the drive unit is configured to vary the speed at which the cooling fan rotates without requiring a similar change in input speed. This allows the drive unit and cooling fan to vary the volume of air passing through the cooling system without requiring the engine to change its operating speed. While the present disclosure supports a cooling fan, the drive unit is operable in any configuration in which a single-direction, constant-speed rotational input is available but a selective, bi-directional and variable speed rotational output is required.

Figure 1:
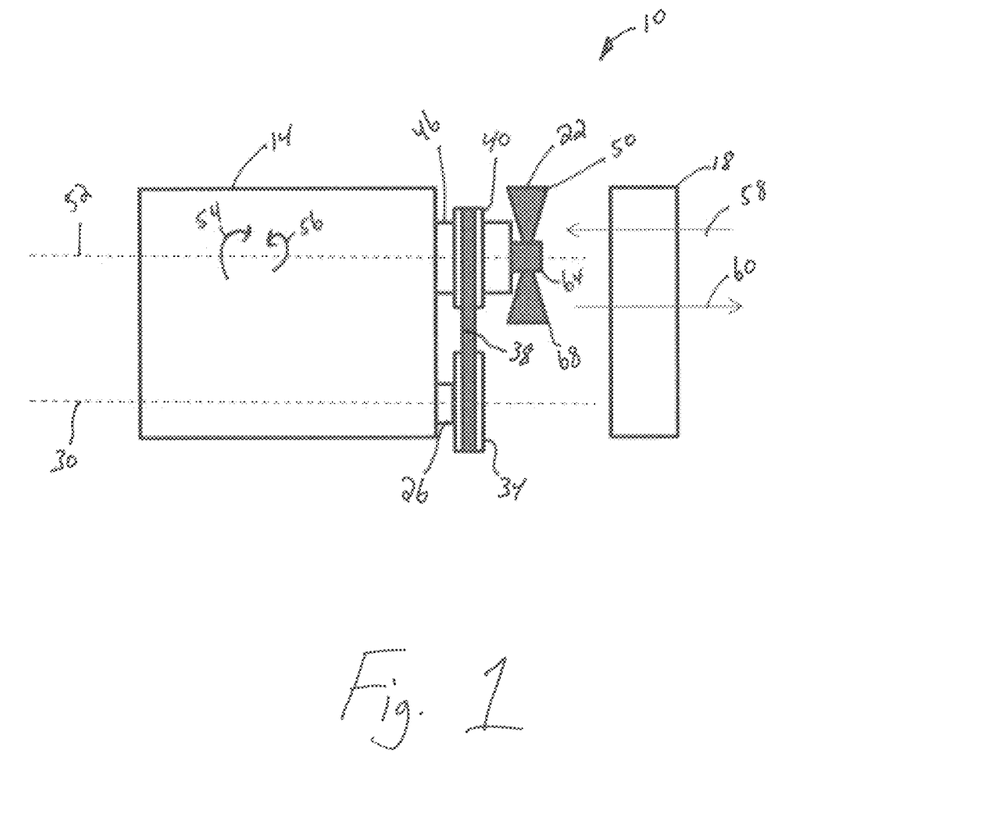
FIG. 1 is a schematic view of an internal combustion engine system.

FIG. 1 illustrates an internal combustion engine system 10 for use in vehicles, powered machinery, and the like. The system 10 includes an internal combustion engine 14, a heat exchanger 18 in fluid communication with the engine 14, and a forced air system 22 to direct air through the heat exchanger 18 and help regulate the temperature of the coolant contained therein Together, the heat exchanger 18 and forced air system 22 help regulate the operating temperature of the engine 14 as is well known in the art.

While the illustrated implementation includes a single heat exchanger 18 in fluid communication with the engine 14, in alternative implementations, the forced air system 22 may direct air through multiple heat exchangers in fluid communication with various elements of the system 10. For example, the heat exchanger may include a radiator, an oil cooler, a condenser, an air cooler, and the like. Furthermore, the engine system 10 may also include one or more protective screens (not shown) through which air is directed by the forced air system 22.

The engine 14 of the internal combustion system 10 includes a crank shaft 26 rotatable about a first axis 30, and an engine pulley 34 coupled to and rotatable together with the crank shaft 26. During operation, the crank shaft 26 rotates in a single direction (e.g., counterclockwise) and at a substantially constant speed. In other implementations, the rotational speed of the crank shaft 26 may vary dependent upon user input.

The system 10 also includes a drive belt 38 extending around and engaging both the engine pulley 34 and the input 40 of the forced air system 22 (described below). During use, the drive belt 38 transmits force and rotational motion between the engine pulley 34 and the input 40 causing the two elements 34, 40 to rotate together as a unit. In the illustrated implementation, the drive belt 38 engages the engine pulley 34 and the input 40 such that both elements 34, 40 rotate in the same direction. However in alternative implementations, different belt paths (e.g., serpentine belts) may be used that cause the input 40 and engine pulley 34 to rotate in opposite directions.

The forced air system 22 of the internal combustion engine system 10 includes a drive unit 46 and a cooling fan 50 driven by the drive unit 46 for selective rotation about a second axis 52. The cooling fan 50 is well known in the art and includes a central hub 64 configured to be coupled to the drive unit 46, and a plurality of blades 68 extending radially from the hub 64. In the illustrated implementation, the blades 68 of the cooling fan 50 are configured for rotation in a first direction 54.

During operation, the system 22 is operable in a standard operating mode in which the cooling fan 50 rotates in the first direction 54 and air is directed through the heat exchanger 18 in a first direction 58 (see FIG. 1), and a reverse operating mode in which the cooling fan 50 rotates in a second direction 56 and air is directed through the heat exchanger 18 in a second direction 60, opposite the first direction 58. In the present implementation, the system 22 generally operates in the standard operating mode for standard cooling operations of the engine 14 and temporarily transitions to the reverse operating mode to clear debris from the heat exchanger 18 when needed.

Figure 2:
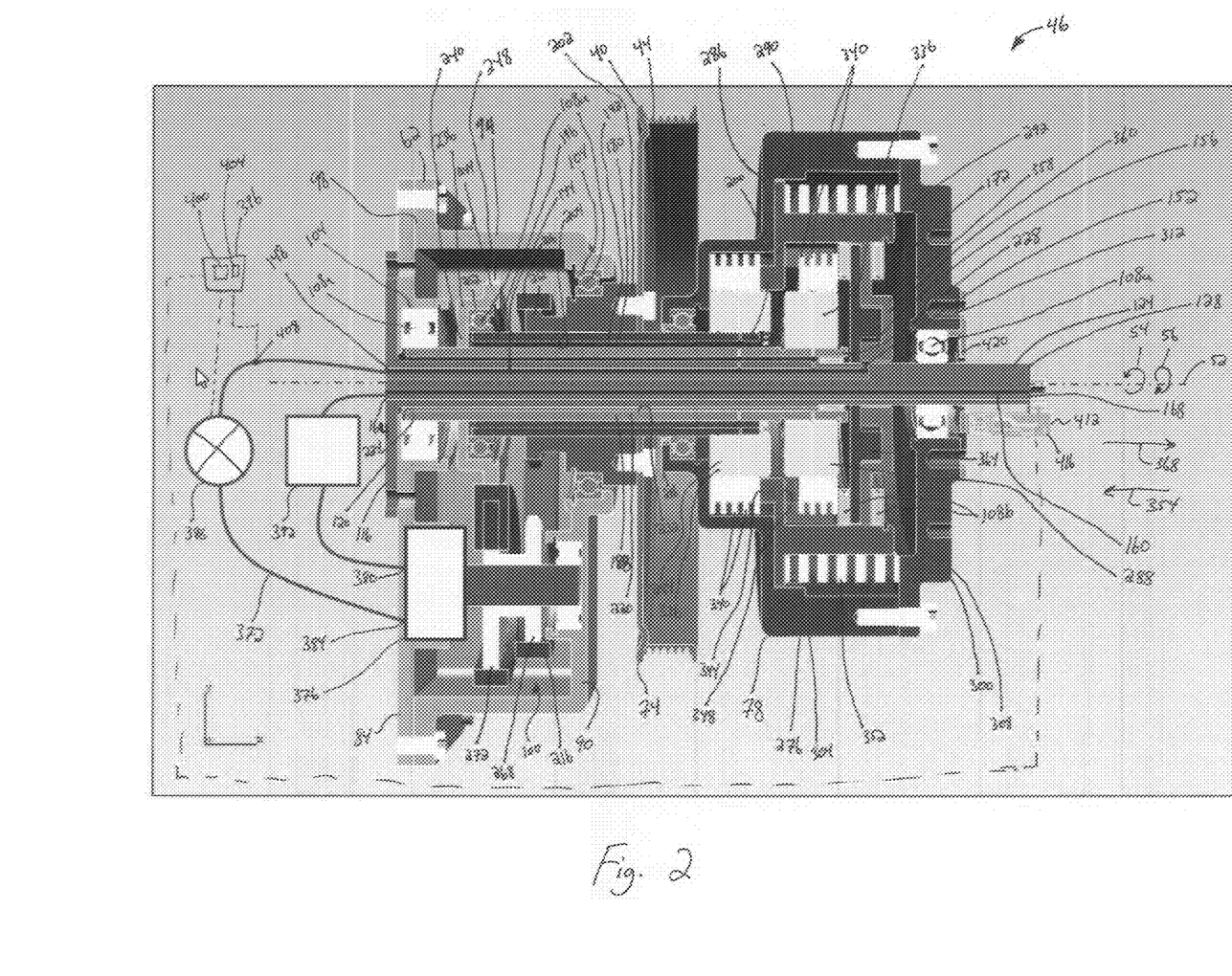
FIG. 2 is a side section view of the drive unit of the internal combustion engine system of FIG. 1.

Referring to FIG. 2 the drive unit 46 of the forced air system 22 includes a housing 62 configured to be mounted to an engine block or other support surface (not shown), a drive assembly 74 driven by the engine 14 (e.g., by the drive belt 38), and a fan mount 78 driven by the drive assembly 74 and configured to provide a mounting location for the cooling fan 50. During use, the drive unit 46 is configured to support and rotate the cooling fan 50 about the second axis 52.

Illustrated in FIG. 2, the housing 62 of the drive unit 46 includes a front plate 80 and an backplate 84. The front plate 80 of the housing 62 is formed from an end wall 90 and one or more side walls 94 extending from the end wall 90 to produce an open end 98. The backplate 84, in turn is coupled to the open end 98 of the front plate 80 to form an enclosed volume 100 therebetween. In the illustrated implementation, the front plate 80 and the backplate 84 both define apertures 104 sized to receive and support a bearing 108a therein. In alternative implementations, the housing 62 may be directly coupled to the support surface without a backplate 84 such that the volume 100 is defined therebetween.

The housing 62 also includes an arbor 116 configured to rotatably support the drive assembly 74 and the fan mount 78 thereon. The arbor 116 includes a base 120 coupled to the backplate 84 of the housing 62, and an elongated body 124 extending axially from the base 120 along the second axis 52 to define a distal end 128. In the illustrated implementation, the arbor 116 is formed separately from the housing 62; however in alternative implementations, the arbor 116 may be formed integrally with the housing 62.

The arbor 116 also includes a feed channel 144 extending axially along the length of the body 124 and configured to provide pressurized hydraulic fluid to the fan mount 78. In the illustrated implementation, the feed channel 144 includes a first end 148 in fluid communication with a source of pressurized hydraulic fluid (e.g., a pump 376, described below), and a second end 152 in fluid communication with a hydraulic volume 156 of the fan mount 78 (described below).

The arbor 116 also includes a return channel 160 extending axially along the length of the body 124 and configured to drain excess fluid from the fan mount 78. The return channel 160 includes a first end 164 in fluid communication with a reservoir 392, and a second end 168 open to the distal end 128 of the arbor 116 and in fluid communication with the mount volume 172 of the fan mount 78 (described below).

Illustrated in FIG. 2, the drive assembly 74 of the drive unit 46 is at least partially supported by the arbor 116 and is configured to produce two counter-rotating shafts from a single rotational input (e.g., the crank shaft 26 of the engine 14). In the illustrated implementation, the drive assembly 74 includes a rotational input 40 driven by the crank shaft 26 via the drive belt 38, a first shaft 180 in operable communication with and driven by the rotational input 40 in the first direction 54, and a second shaft 184 in operable communication with and driven by the rotational input 40 in the second direction 56. During use, the first shaft 180 rotates at a first speed while the second shaft 184 rotates at a second speed greater than the first speed.

Illustrated in FIG. 2, the rotational input 40 of the drive assembly 74 includes an input pulley 44 mounted for rotation with respect to the housing 62 about the second axis 52. During use, the input pulley 44 at least partially supports the drive belt 38 thereon causing the input pulley 44 and the engine pulley 34 to rotate together as a unit. In the illustrated implementation, the pulley 44 is fixedly coupled to and rotates together with the first shaft 180. However, in alternative implementations, the input pulley 44 may be mounted on an independent shaft (not shown) that, in turn, is in direct operable communication with at least one of the first shaft 180 and the second shaft 184. In other implementations, the input pulley 44 may be integrally formed with one of the first shaft 180 and the second shaft 184. In still other implementations, the input pulley 44 may be fixedly coupled to and rotate together with the second shaft 184.

While the rotational input 40 of the illustrated drive assembly 74 includes a pulley 44, it is to be understood that the rotational input 40 may include alternative forms of force conveyance such as a chain driven sprocket, an internal or external gear set, and the like. Furthermore, in still other implementations, at least one of the first shaft 180 and the second shaft 184 may be directly driven by an exterior power source (not shown).

The first shaft 180 of the drive assembly 74 is substantially cylindrical in shape having a body 192 with a first end 196, a second end 200 opposite the first end 196, and defining a first channel 204 therethrough. During use, the first shaft 180 is mounted for rotation about the second axis 52 and configured to rotate together with the input pulley 44 in the first direction 54.

The first shaft 180 also includes a set of external teeth 212 configured to selectively engage the links of a roller chain 216. In the illustrated implementation, the external teeth 212 of the first shaft 180 are formed separately from the first shaft 180 on a shaft sleeve 202 that is press fit onto the first shaft 180 to rotate together therewith. In other implementations, the external teeth 212 may be rotatably fixed to the first shaft 180 with a key, splines, and the like. In still other implementations, the external teeth 212 may be formed integrally with the shaft itself.

The second shaft 184 of the drive assembly 74 is substantially cylindrical in shape having a body 220 with a first end 224, a second end 228 opposite the first end 224, and defining a second channel 232 therethrough. During operation, the second shaft 184 is mounted for rotation about the second axis 52 and configured to rotate opposite the first shaft 180 (e.g., in the second direction 56).

In the illustrated implementation, the exterior diameter of the second shaft 184 substantially corresponds to the interior diameter of the first channel 204 of the first shaft 180, allowing the second shaft 184 to be co-axially nested therein. Similarly, the interior diameter of the second shaft 184 substantially corresponds with the outer diameter of the first portion 132 of the arbor 116, allowing the arbor 116 to be co-axially nested within the second shaft 184. In the illustrated implementation, a needle bearing 108b is positioned between the second shaft 184 and the arbor 116 to maintain the desired relative radial positioning therebetween.

In the illustrated implementation, the second shaft 184 also includes a shaft extension 236 coupled to the first end 224 thereof and rotatable together therewith. The shaft extension 236 includes a first end 240 coupled to the first end 224 of the second shaft 184, and a second end 244 opposite the first end 240 that defines a plurality of external sprocket teeth 248. Once assembled, the shaft extension 236 is supported for rotation about the second axis 52 by a bearing 108a supported by the housing 62. In the illustrated implementation, the shaft extension 236 is formed separately from the second shaft 184 and welded thereto, however in alternative implementations, the shaft extension 236 and the second shaft 184 may be formed together.

As shown in FIG. 2, the shaft extension 236 also defines an interior bearing support 252 proximate the second end 244 thereof. Once assembled, the interior bearing support 252 of the shaft extension 236 receives a bearing 108a therein that co-axially positions the first end 196 of the first shaft 180 with the shaft extension 236 and the first end 224 of the second shaft 184.

The drive assembly 74 also includes a secondary shaft 188 configured to transfer force between the first shaft 180 and the second shaft 184 during operation. More specifically, the secondary shaft 188 is configured to switch the rotational direction between the two shafts 180, 184 and increase the speed of the second shaft 184 relative to the first shaft 180. In the illustrated implementation, the secondary shaft 188 includes a first set of external teeth 268 configured to engage the links of the roller chain 216, and a second set of external teeth 272 configured to engage external teeth 248 of the shaft extension 236.

During use, the first set of external teeth 268 are axially aligned with the external teeth 212 of the first shaft 180 so that the chain 216 may wrap around and engage both sets simultaneously. As such, force is transmitted between the first shaft 180 and the secondary shaft 188 causing both shafts 180, 188 to rotate in the same direction. In the illustrated implementation, the teeth 268 of the secondary shaft 188 form a smaller sprocket diameter than the teeth 212 of the first shaft 180, causing the secondary shaft 188 to rotate faster than the first shaft 180. However, in alternative implementations, the relative size of the two sprocket diameters may be adjusted as necessary to produce the desired rotational speeds.

The second set of external teeth 272 of the secondary shaft 188 mesh with the external teeth 248 of the shaft extension 236 causing the secondary shaft 188 and the second shaft 184 (via the shaft extension 236) to rotate in opposite directions. In the illustrated implementation, the second set of external teeth 272 form a lantern gear; however in alternative implementations, any form of external toothed gear, such as a spur gear, may be used.

Figure 3A:
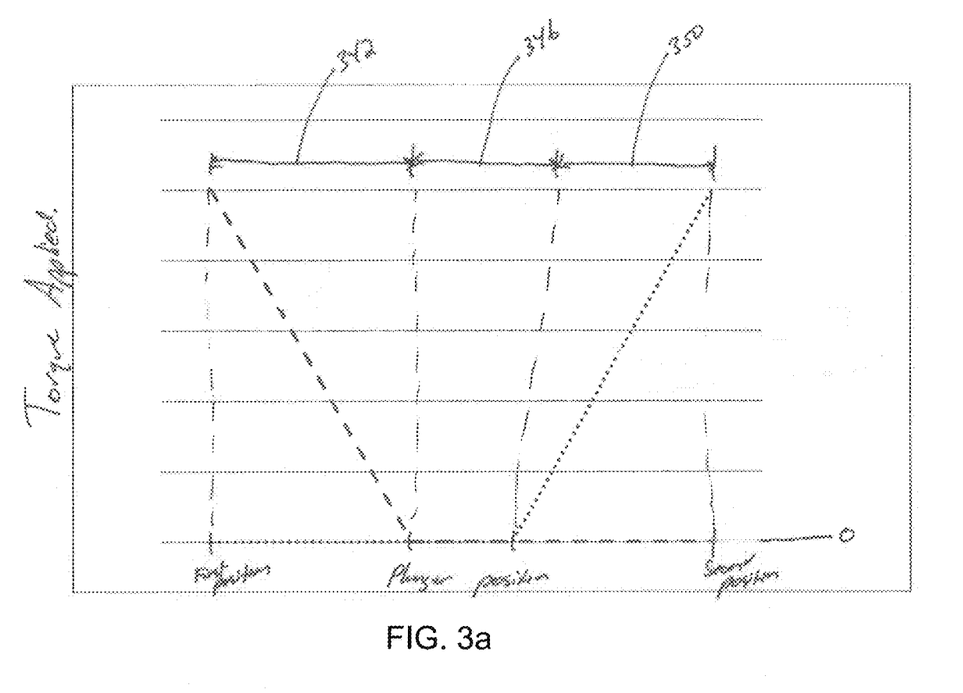
FIGS. 3a-3b are charts illustrating clutch pack and cooling fan operation in different operating conditions.
Figure 3B:
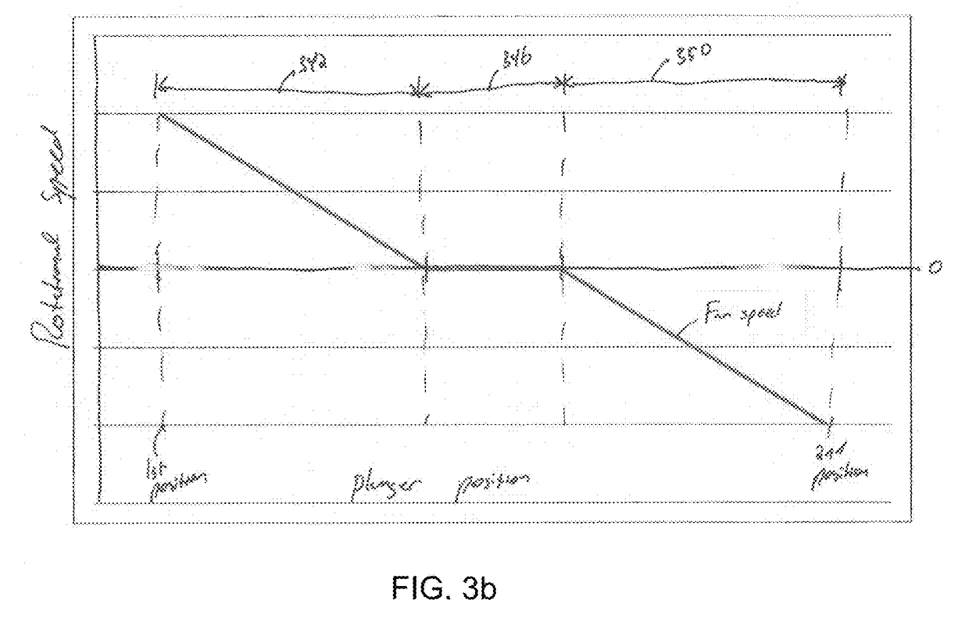

Illustrated in FIGS. 2 and 3, the fan mount or rotational output 78 of the drive unit 46 is substantially cylindrical in shape being mounted for rotation about the second axis 52. The fan mount 78 includes a housing 276, a first clutch pack 284 extending between and in operable communication with the housing 276 and the first shaft 180, a second clutch pack 288 extending between and in operable communication with the housing 276 and the second shaft 184, and a plunger 292 selectively engageable with both the first clutch pack 284 and the second clutch pack 288. Once assembled, the fan mount 78 of the drive unit 46 is coupled to the cooling fan 50 such that the fan 50 and fan mount 78 rotate together as a unit.

The housing 276 of the fan mount 78 is substantially cylindrical in shape having a first end 296 proximate the housing 62, and a second or distal end 300 opposite the first end 296. In the illustrated implementation, the housing 276 of the fan mount 78 is formed from a first housing portion 304 and a second housing portion 308 coupled together to form a mount volume 172 therebetween. The housing 276, also defines a series of apertures 312 proximate the distal end 300 to which the cooling fan 50 may be coupled during use. The apertures 312, in turn, are oriented in a bolt pattern (not shown) centered about the second axis 52. Once assembled, the housing 276 is configured to maintain the fluid integrity of the second volume 280 so that a volume of fluid (e.g., oil) can be stored therein.

The first clutch pack 284 of the fan mount 78 extends between and is in operable communication with the first shaft 180 and the housing 276 to selectively transmit force therebetween. The first clutch pack 284 includes a plurality of clutch disks 336 coupled to and rotatable together with the first shaft 180, and a plurality of clutch plates 340 coupled to and rotatable together with the housing 276. As is well known in the art, the clutch disks 336 and clutch plates 340 are stacked axially in an alternating pattern such that applying a compressive axial force to the clutch pack 284 causes the disks 336 and plates 340 to frictionally engage one another and transmit force therebetween.

During operation, the first clutch pack 284 is operable in an engaged configuration in which the clutch pack 284 transmits force between the first shaft 180 and the housing 276, and a disengaged configuration in which the clutch pack 284 does not transmit force between the first shaft 180 and the housing 276. When operating in the engaged configuration, the fan mount 78 is further able to alter the level of force being transmitted between the first shaft 180 and the housing 276 by varying the magnitude of the compressive force applied to the clutch pack 284. Generally speaking, the larger the axial compressive force applied to the clutch pack 284, the larger the level of force that is transmitted between the first shaft 180 and the housing 276. Furthermore, if the applied force exceeds a predetermined "engagement limit," the clutch pack 284 becomes "fully engaged." For the purposes of this application, a fully engaged clutch pack is defined as a clutch pack in which the two elements 180, 276 rotate together as a unit (e.g., no slippage occurs between the two elements).

In instances in which the clutch pack 284 is not fully engaged (e.g., the force applied to the clutch pack 284 is less than the engagement limit), slippage occurs between the disks 336 and the plates 340 causing the shaft 180 and the housing 276 to rotate at different speeds. Generally speaking, lowering the axial force applied to the clutch pack 284 increases slippage and causes the housing 176 to rotate at a slower speed. In contrast, increasing the force applied to the clutch pack 284 reduces slippage and causes the housing 176 to rotate at a faster speed. (See FIG. 3b).

The second clutch pack 288 of the fan mount 78 is substantially similar to and operates in the same manner as the first clutch pack 284. The second clutch pack 288 extends between and is in operable communication with the second shaft 184 and the housing 276 to selectively transmit force therebetween. More specifically, the second clutch pack 288 engages the plunger 292 (described below) which in turn is rotationally fixed with respect to the housing 276. The second clutch pack 288 includes a plurality of clutch disks 336 coupled to and rotatable together with the second shaft 184, and a plurality of clutch plates 340 coupled to and rotatable together with the housing 276 (via the plunger 292) of the fan mount 78. As described above, the clutch disks 336 and clutch plates 340 are stacked axially in an alternating pattern such that applying a compressive axial force to the clutch pack 284 causes the disks 336 and plates 340 to frictionally engage one another and transmit force therebetween.

During operation, the second clutch pack 288 is operable in an engaged configuration in which the clutch pack 288 transmits force between the second shaft 184 and the housing 276, and a disengaged configuration in which the clutch pack 288 does not transmit force between the second shaft 184 and the housing 276. When operating in the engaged configuration, the fan mount 78 is further able to alter the level of force being transmitted between the second shaft 184 and the housing 276 as described above.

In the illustrated implementation, both the first clutch pack 284 and the second clutch pack 288 are "wet" style clutches, configured to be immersed in a cooling lubricating fluid or oil contained within the mount volume 172 of the housing 276. While the illustrated clutch packs 284, 288 are shown as disk-style clutches; in alternative implementations, either clutch may include alternative clutch types that permit the selective and/or variable transmission of forces therethrough, such as but not limited to, a hydraulic clutch, a dog clutch, a centrifugal clutch, a cone clutch, and the like.

Illustrated in FIG. 2, the plunger 292 of the fan mount 78 is substantially cylindrical in shape having a first contact surface 344 configured to selectively engage the first clutch pack 284, and a second contact surface 348 configured to selectively engage the second clutch pack 288. During use, the plunger 292 of the fan mount 78 is axially movable with respect to the housing 276 between a first position in which the plunger 292 is positioned proximate the first end 296 of the housing 276, and a second position in which the plunger 292 is positioned proximate the distal end 300 of the housing 276. Between these endpoints, the plunger's range of motion passes through a first region 342 in which the first contact surface 344 engages and applies a compressive force to the first clutch pack 284 while the second contact surface 348 does not engage the second clutch pack 288, a second region 346 in which neither the first contact surface 344 nor the second contact surface 348 engage their respective clutch packs 284, 288, and a third region 350 in which the first contact surface 344 does not engage the first clutch pack 284 while the second contact surface 348 engages and applies a compressive force to the second clutch pack 288. (See FIGS. 4a and 4b). In the illustrated implementation, the plunger 292 is able to freely and continuously move within the mount volume 172 between the first position and the second position, passing through each of the three regions 242, 246, 250 consecutively.

The plunger 292 includes a series of teeth 286 extending radially outwardly therefrom that are configured to engage a series of grooves 290 of the housing 276. Together, the teeth 286 and grooves 290 rotationally fix the plunger 292 to the housing 276 so that the two items rotate together as a unit while allowing the plunger 292 to move axially with respect to the housing 276 between the first position and the second position. As such, during operation, rotational forces are conveyed from the second shaft 184, through the second clutch pack 288 to the plunger 292, and through the plunger 292 to the housing 276. In all, the second clutch pack 288 is able to convey forces between the housing 276 and the second shaft 184.

The plunger 292 also includes a biasing member 352 extending between and engaging both the plunger 292 and the housing 276 of the fan mount 78. More specifically, the biasing member 352 biases the plunger 292 in a first axial direction 354 and toward the first position (e.g., into engagement with the first clutch pack 284). In the illustrated implementation, the biasing member 352 is sufficiently strong to apply a compressive force against the first clutch pack 284 in excess of the engagement limit (described above). During use, the biasing member 352 provides a fail-safe condition where, in the absence of any hydraulic pressure in the system, the fan 50 rotates in the first direction at full speed (e.g., the first clutch pack 284 is fully engaged).

The plunger 292 also includes a piston assembly 356 configured to bias the plunger 292 in a second axial direction 368 against the force of the biasing member 352. The piston assembly 356 includes a piston 360 coupled to the plunger 292 and axially movable together therewith, and a backplate 364 at least partially nested within the piston 360 to form the hydraulic volume 156 therebetween. During operation, the introduction of hydraulic fluid into the hydraulic volume 156 causes the piston 360 and plunger 292 to move together in the second axial direction 368 and toward the second position. In contrast, removing hydraulic fluid from the hydraulic volume 156 allows the biasing member 352 to bias the piston 360 and plunger 292 together in the first axial direction 354 and back toward the first position. In the illustrated implementation, the piston 360 and backplate 364 are fixed rotationally to the arbor 116. Therefore the plunger 292 includes a pair of thrust bearings 108b to transmit force between the piston assembly 356 and the plunger 292 and second clutch pack 288, respectively.

The drive unit 46 also includes a hydraulic system 372. The hydraulic system 372 includes a pump 376 having an inlet 380 and an outlet 384, an adjustable valve 388 in fluid communication with the inlet 380 of the pump 376, and a reservoir 392 in fluid communication with the outlet 384 of the pump 376. During use, the valve 388 is adjustable to vary the volume and pressure of hydraulic fluid provided to the piston assembly 356 of the plunger 292.

The pump 376 of the hydraulic system 372 is at least partially positioned within the volume 100 of the housing 62 and driven by the rotational input 40. More specifically, the pump 376 is coupled to and driven by the secondary shaft 288 of the drive unit 46. During use, the pump 376 receives hydraulic fluid from the reservoir 392 and outputs pressurized hydraulic fluid to the valve 388 for use by the piston assembly 356.

While the illustrated implementation includes a built-in hydraulic system, it is also appreciated that the drive unit 46 may also be placed in fluid communication with an external hydraulic system, such as the hydraulic system of the associated engine 14 and the like.

The drive unit 46 also includes a control system 396 configured to monitor the operation of the drive unit 46 and control the rotational speed and direction of rotation of the fan 50. The control system 396 includes a processor 400, a memory unit 404, in operable communication with the processor 400, one or more sensors 408, 412 sending and receiving signals from the processor 400, and a user input (not shown) in operable communication with the processor 400. The processor 400 is also in operable communication with various elements of the drive unit 46 including, but not limited to, the pump 376, the valve 388, the reservoir 392, and the like. During use, the processor 400 receives signals from the one or more sensors 408, 412, combines that information with one or more predetermined control algorithms, and outputs signals to control the rotational speed and direction of the fan 50.

In particular, the drive unit 46 includes a hydraulic pressure sensor 408 configured to detect the pressure of hydraulic pressure in the feed channel 144, and a speed sensor 412 configured to detect the speed at which the drive unit 46 is rotating about the second axis 52. Although not illustrated, the drive unit 46 may also include a level sensor to detect the level of hydraulic fluid contained within the reservoir 392.

The speed sensor 412 includes a hall effect sensor 416 coupled to the arbor 116 of the drive unit 46 and a disk 420 coupled to and rotatable together with the housing 276 of the drive unit 46. During use, the rotation of the housing 276 with respect to the arbor 116 cause the disk 420 to rotate with respect to the sensor 412. This rotation, in turn, is detected by the sensor 416 which outputs a signal to the control system 396 indicative of the rotational speed of the housing 276 relative to the arbor 116.

In some implementations, the heat generated by the clutch packs 284, 288 may exceed the passive heat rejection of the drive unit 46. In such implementations, the drive unit 46 may include one or more lubrication orifices (not shown) formed into the backplate 364, the piston 360, and the like to direct hydraulic fluid into the mount volume 172. As such, when fluid is introduced into the hydraulic volume 156, controlled leakage through the apertures directs the fluid toward the first and second clutch packs 284, 288 to at least partially dissipate some of the generated heat. The heated oil is then returned to the reservoir 166 via the return channel 160 of the arbor 116.

During operation, the drive unit 46 is operable in a first or forward configuration, a second or neutral configuration, and a third or reverse configuration. In the forward configuration, the plunger 292 is positioned in the first region 342 placing the first clutch pack 284 in the engaged configuration and the second clutch pack 288 in the disengaged configuration. As such, torque is applied to the fan mount 78 and the attached cooling fan 50 in the first direction 54.

While operating in the first configuration, the magnitude of the torque applied to the fan mount 78 can be adjusted by moving the plunger 292 within the first region 342. More specifically, the magnitude of the torque applied to the fan mount 78 can be increased by moving the plunger 292 in the first axial direction 354 (e.g., by removing hydraulic fluid from the hydraulic volume 156). In contrast, the magnitude of the torque applied to the fan mount 78 can be decreased by moving the plunger 292 in the second direction 368 (e.g., by adding hydraulic fluid to the hydraulic volume 156; see FIG. 3a).

In the second configuration, the plunger 292 is positioned in the second region 346 placing both the first clutch pack 284 and the second clutch pack 288 in a disengaged configuration. As such, no torque is applied to the fan mount 78, allowing the cooling fan 50 to free-wheel or remain stationary.

In the third configuration, the plunger 292 is positioned in the third region 350 placing the first clutch pack 284 in a disengaged configuration and the second clutch pack 288 in an engaged configuration. As such, torque is applied to the fan mount 78 and the attached cooling fan 50 in the second direction 56.

While operating in the third configuration, the magnitude of the torque applied to the fan mount 78 can be adjusted by moving the plunger 292 within the third region 350. More specifically, the magnitude of the torque applied to the fan mount 78 can be increased by moving the plunger 292 in the second axial direction 368 (e.g., by introducing hydraulic fluid into the hydraulic volume 156). In contrast, the magnitude of the torque applied to the fan mount 78 can be decreased by moving the plunger 292 in the first direction 354 (e.g., by removing hydraulic fluid from the hydraulic volume 156; see FIG. 3a).

During operation of the internal combustion engine 14, the crank shaft 26 rotates about the first axis 30 which, in turn, drives the input pulley 44 of the drive unit 46 in the first direction 54. Operation of the engine 14 also generates heat which must be dissipated by the heat exchanger 18 and the forced air system 22. During normal cooling operations, the forced air system 22 generally operates in the standard mode of operation whereby the cooling fan 50 rotates in the first direction 54 and draws air through the heat exchanger 18 in the first direction 58 (see FIG. 1). To rotate the fan 50 in the first direction 54, the drive unit 46 operates in the forward configuration (described above).

To clear the heat exchanger 18 of debris, the forced air system 22 temporarily transitions into the reverse mode of operation. To do so, hydraulic fluid is introduced into the hydraulic volume 156 until the plunger 292 leaves the first region 342 and enters the second region 346. By doing so, the first contact surface 344 of the plunger 292 disengages from the first clutch pack 284 causing the first clutch pack 284 to switch to a disengaged configuration. This transition places the drive unit 46 in the neutral configuration whereby no torque is applied to the fan mount 78 or the cooling fan 50 attached thereto. As such, the cooling fan 50 continues to rotate in the first direction 54 under its own inertia.

After passing through the second region 346, hydraulic fluid continues to be introduced into the hydraulic volume 156 until the plunger 292 leaves the second region 346 and enters the third region 350. By doing so, the second contact surface 348 of the plunger 292 engages the second clutch pack 288 and begins to apply compressive forces thereto. This transition causes the second clutch pack 288 to enter an engaged configuration and the drive unit 46 to enter the reverse configuration. As such, a torque is applied to the fan mount 78 in the second direction of rotation 56 (e.g., opposite its direction of travel).

As hydraulic fluid continues to accumulate in the hydraulic volume 156 the magnitude of the torque applied to the fan mount 78 in the second direction 56 increases. This torque acts as a brake, forcing the fan mount 78 and cooling fan 50 to slow down, stop, and begin rotating in the second direction 56. After the cooling fan 50 begins rotating in the second direction 56, hydraulic fluid may be introduced or removed from the hydraulic volume 156 as necessary to produce the level of torque required to maintain the desired rotational speed of the cooling fan 50. This completes the transition to the reverse mode of operation.

As described above, rotating the cooling fan 50 in the second direction 56 forces air to flow through the radiator in the second direction 60, thereby dislodging and clearing the radiator of debris.

Once the heat exchanger 18 is clear of debris, the forced air system 22 may transition back to the standard mode of operation to resume normal cooling operations. To do so, hydraulic fluid is removed from the hydraulic volume 156, allowing the plunger 292 to move toward the first axial direction 354 under the force of the biasing member 352. As hydraulic fluid leaves the hydraulic volume 156 the plunger 292 leaves the third region 350 and enters the second region 346. By doing so, the second contact surface 348 of the plunger 292 disengages from the second clutch pack 288 causing the second clutch pack to switch from the engaged configuration to the disengaged configuration. This transition places the drive unit 46 in the neutral configuration whereby no torque is applied to the fan mount 78 or the cooling fan 50 attached thereto. As such, the cooling fan 50 continues to rotate in the second direction 56 under its own inertia.

After passing through the second region 346, hydraulic fluid continues to be removed from the hydraulic volume 156 until the plunger 292 leaves the second region 346 and enters the first region 342. By doing so, the first contact surface 344 of the plunger 292 engages the first clutch pack 284 and begins to apply compressive forces thereto. This transition causes the first clutch pack 284 to enter an engaged configuration and the drive unit 46 to enter the forward configuration. As such, a torque is applied to the fan mount 78 in the first direction of rotation 54 (e.g., opposite its direction of travel).

As hydraulic fluid continues to leave the hydraulic volume 156, the magnitude of the torque applied to the fan mount 78 in the first direction 54 increases. This torque acts as a brake, forcing the fan mount 78 and cooling fan 50 to slow down, stop, and begin rotating in the first direction 54. After the cooling fan 50 begins rotating in the first direction 54, hydraulic fluid may be introduced or removed from the hydraulic volume 156 as necessary to produce the level of torque required to maintain the desired rotational speed of the cooling fan 50 upon which time the forced air system 22 may return to the standard operation mode.

Various features of the disclosure are set forth in the following claims.

What is claimed is:

1. A rotational drive unit comprising:
    an input rotatable about a first axis of rotation, the input configured to be driven by a power source in a single rotational direction;
    a first shaft in operable communication with the input and configured to rotate in a first direction;
    a second shaft in operable communication with the input and configured to rotate in a second direction opposite the first direction;
    an output rotatable about a second axis of rotation;
    a clutch assembly in operable communication with the first shaft, the second shaft, and the output, wherein the clutch assembly is operable in a first configuration in which force is transmitted between the first shaft and the output, and a second configuration in which force is transmitted between the second shaft and the output; and
    wherein the output rotates in the first direction during the first configuration, and wherein the output rotates in the second direction during the second configuration.

2. The rotational drive unit of claim 1, wherein the first shaft, and the second shaft are coaxial.

3. The rotational drive unit of claim 1, further comprising a secondary shaft, and wherein the secondary shaft is operatively engaged with the first shaft and the second shaft.

4. The rotational drive unit of claim 3, wherein the secondary shaft is operatively engaged with the first shaft with an external gear set.

5. The rotational drive unit of claim 3, wherein the secondary shaft is operatively engaged with the second shaft with one of a belt and a chain.

6. The rotational drive unit of claim 1, wherein the first shaft and the second shaft rotate at different speeds.

7. The rotational drive unit of claim 1, wherein the second shaft rotates at a higher speed than the first shaft.

8. The rotational drive unit of claim 1, further comprising a fan assembly coupled to and rotatable together with the output.

9. A rotational drive unit comprising:
    an input rotatable about a first axis of rotation, the input configured to be driven by a power source in a single rotational direction;
    a first shaft in operable communication with the input and configured to rotate in a first direction;
    a second shaft in operable communication with the input and configured to rotate in a second direction opposite the first direction;
    an output rotatable about a second axis of rotation;
    a clutch assembly in operable communication with the first shaft, the second shaft, and the output, wherein the clutch assembly is operable in a first configuration in which force is transmitted between the first shaft and the output, and a second configuration in which force is transmitted between the second shaft and the output; and
    wherein the clutch assembly includes a first clutch pack in operable communication with and extending between the first shaft and the output, and wherein the clutch assembly includes a second clutch pack in operable communication with and extending between the second shaft and the output.

10. The rotational drive unit of claim 9, wherein the clutch assembly includes a first piston selectively engageable with the first clutch pack and the second clutch pack.

11. The rotational drive unit of claim 9, wherein the output includes a housing mounted for rotation about the second axis and at least partially defining a volume therein, and wherein the clutch assembly includes a first piston at least partially positioned within the volume and movable with respect to the housing between a first position, where the first piston engages the first clutch pack, and a second position, where the first piston engages the second clutch pack.

12. The rotational drive unit of claim 11, wherein the clutch assembly includes a biasing member configured to bias the first piston toward the first position.

13. The rotational drive unit of claim 11, wherein the first clutch pack and the second clutch pack are at least partially positioned within the volume.

14. A rotational drive unit for a fan comprising:
a housing;
an input rotatable with respect to the housing about a first axis of rotation, wherein the input is rotatable in only a first direction;
a first shaft driven by the input and configured to rotate with respect to the housing in the first direction;
a second shaft driven by the input and configured to rotate with respect to the housing in only a second direction opposite the first direction;
an output rotatable with respect to the housing about a second axis of rotation;
a first clutch assembly in operable communication with the first shaft and the output, wherein the first clutch assembly is operable in an engaged configuration in which force is conveyed between the first shaft and the output, and a disengaged configuration in which force is not conveyed between the first shaft and the output;
a second clutch assembly in operable communication with the second shaft and the output, wherein the second clutch assembly is operable in an engaged configuration, in which force is conveyed between the second shaft and the output, and a disengaged configuration, in which force is not conveyed between the second shaft and the output; and
wherein the first shaft and the second shaft are coaxial.

15. The rotational drive unit of claim 14, wherein the rotational drive unit is operable in a forward configuration, in which the first clutch is in the engaged configuration and the second clutch is in the disengaged configuration, and a reverse configuration, where the first clutch is in the disengaged configuration and the second clutch is in the engaged configuration.

16. The rotational drive unit of claim 14, wherein at least one of the first clutch assembly and the second clutch assembly are adjustable to vary the level of force conveyed therethrough.

* * * * *